United States Patent [19]

Kohmoto et al.

[11] Patent Number: 4,592,948

[45] Date of Patent: Jun. 3, 1986

[54] MAGNETIC RECORDING MEDIUM

[75] Inventors: Osamu Kohmoto, Ichikawa; Yasufumi Takasugi; Hiroshi Sugihara, both of Saku; Masaharu Nishimatsu, Komoro, all of Japan

[73] Assignee: TDK Corporation, Tokyo, Japan

[21] Appl. No.: 563,512

[22] Filed: Dec. 20, 1983

[30] Foreign Application Priority Data

Dec. 25, 1982 [JP] Japan ............................. 57-234817

[51] Int. Cl.[4] ............................................. G11B 5/72
[52] U.S. Cl. .................................. 428/216; 360/134; 360/135; 360/136; 427/131; 427/132; 428/215; 428/336; 428/694; 428/695; 428/900
[58] Field of Search ............... 428/694, 695, 216, 215, 428/336; 427/131, 132, 44; 360/134–136

[56] References Cited

U.S. PATENT DOCUMENTS 4,425,404 1/1984 Suzuki ................................. 428/694
4,429,024 1/1984 Meno .................................. 428/694

Primary Examiner—Ellis P. Robinson
Attorney, Agent, or Firm—Oblon, Fisher, Spivak, McClelland & Maier

[57] ABSTRACT

A magnetic recording medium for use in video and other applications is presented which comprises a substrate, a continuous thin magnetic layer of cobalt and at least one selected from nickel, chromium, and oxygen, preferably obliquely evaporated on the substrate, and a topcoat formed over the magnetic layer and consisting of a monoalkylamine in which the alkyl contains 10 to 22 carbon atoms.

14 Claims, 1 Drawing Figure

MAGNETIC RECORDING MEDIUM

BACKGROUND OF THE INVENTION

This invention relates to magnetic recording media, and more particularly, to magnetic recording media having a magnetic layer in the form of a continuous thin film formed by the so-called oblique incidence evaporation process.

Among magnetic recording media for use in video, audio and other applications, active research and development works have been made on magnetic recording media, usually magnetic tapes having a magnetic layer in the form of a continuous thin film because of the compactness of a roll of tape.

The preferred magnetic layers for such continuous film type media are deposited films of Co, Co-Ni, Co-O, Co-Ni-O and similar systems formed by the so-called oblique incidence evaporation process in which cobalt and optional elements are evaporated and directed at a given angle with respect to the normal to the substrate because such evaporated films exhibit superior characteristics. The evaporated magnetic layers, however, have many disadvantages including high dynamic friction, low film strength, rough head contact, and low runnability (that is, the durability of tape which travels in frictional contact with rigid members in a video machine) resulting in reduced output after repeated travels. In the case of video application, the evaporated magnetic layers exhibit a short life time when operated in the still mode (to be simply referred to as "still life", hereinafter). In addition, there occur many dropouts in such layers.

Under these circumstances, a variety of topcoats have heretofore been proposed which cover obliquely evaporated magnetic layers. For example, Japanese Patent Application Kokai Nos. 53-88704 and 55-93533 disclose such topcoats formed from linear chain saturated fatty acids and esters thereof by evaporation and coating techniques. These prior art topcoats, however, are yet insufficient with respect to some of the above requirements, for example, runnability, still life, and dropout.

SUMMARY OF THE INVENTION

It is, therefore, an object of the present invention to provide a magnetic recording medium having a continuous thin magnetic layer covered with a novel topcoat which has improved characteristics including low dynamic friction, high strength and lubricity, smooth head contact, increased runnability, prolonged still life, and minimized dropouts.

According to the present invention, there is provided a magnetic recording medium comprising a substrate, a continuous thin magnetic layer on the substrate, and a topcoat formed over the magnetic layer, characterized in that the topcoat consists of a compound having the formula:

$$RNH_2$$

where R is selected from alkyl radicals having 10 to 22 carbon atoms.

BRIEF DESCRIPTION OF THE DRAWING

The above and other objects, features, and advantages of the present invention will be more fully understood by reading the following description when taken in connection with the accompanying drawing, in which.

DETAILED DESCRIPTION OF THE INVENTION

Figure 1:
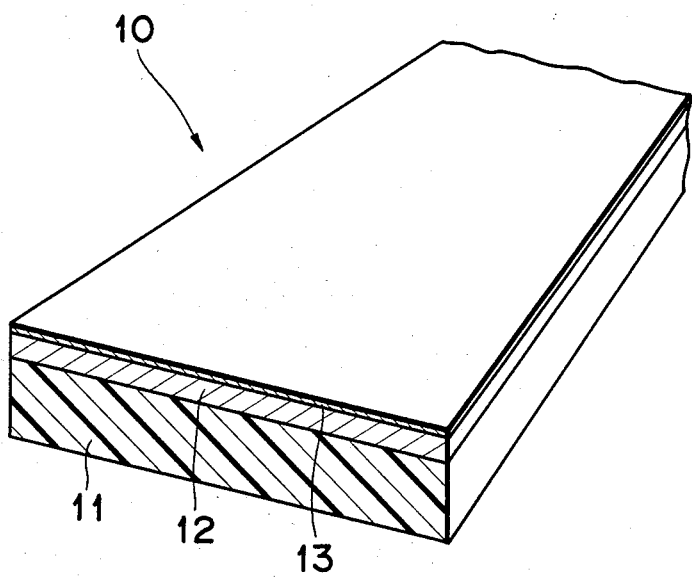
FIG. 1 is a partially cut-away, perspective view of the magnetic recording medium of the present invention.

Referring to FIG. 1, there is illustrated a magnetic recording medium generally designated at 10 according to the present invention. The magnetic recording medium 10 includes a substrate 11, a magnetic layer 12 formed thereon, and a topcoat 13. These elements will be described in more detail hereinafter.

The magnetic recording medium of the present invention has a magnetic layer on a substrate. The magnetic layer is of continuous thin film type coextending over the substrate and is generally composed solely of or based on cobalt or nickel. In the preferred embodiment of the present invention, the magnetic layer may contain cobalt (Co) as an essential base. It may preferably consist essentially of cobalt; cobalt and nickel; cobalt and oxygen; or cobalt, nickel, and oxygen. That is, the magnetic layer may consist essentially of cobalt alone or a mixture of cobalt with nickel and/or oxygen.

Where the layer consists essentially of cobalt and nickel, the weight ratio of Co/Ni may preferably be at least 1.5.

The magnetic layer may further contain oxygen in addition to cobalt or cobalt and nickel. The presence of oxygen contributes to further improvements in electromagnetic characteristics and runnability. In this case, the atomic ratio of O/Co (when nickel free) or O/(Co+Ni) is preferably not more than 0.45, more preferably from 0.15 to 0.4.

More preferred results are obtained when the magnetic layer contains chromium in addition to cobalt; cobalt and nickel; cobalt and oxygen; or cobalt, nickel, and oxygen. The presence of chromium contributes to further improvements in electromagnetic characteristics, output level, signal-to-noise (S/N) ratio, and film strength. In this case, the weight ratio of Cr/Co (when nickel free) or Cr/(Co+Ni) is preferably in the range of 0.001 to 0.1, more preferably 0.005 to 0.05.

The magnetic layer may further contain trace elements, particularly transition metal elements, for example, Fe, Mn, V, Zr, Nb, Ta, Mo, W, Ti, Cu, Zn, etc.

The magnetic layer preferably consists of a coalescence of particles of columnar structure oriented oblique to the normal to the substrate because of enhanced electromagnetic characteristics. More specifically, particles of columnar structure are preferably oriented at an angle of 20 to 60 degrees with respect to the normal to the major surface of the substrate. Each columnar particle generally extends throughout the thickness of the magnetic layer and has a diameter of the order of 50 to 500 angstroms. Cobalt and optional metals such as nickel and chromium form the columnar structure particles themselves while oxygen, when added, is generally present on the surface of each columnar structure particle essentially in the form of oxides. The magnetic layer generally has a thickness of 0.05 to 0.5 microns.

The magnetic layer may be formed on the substrate either directly or via an undercoat layer. Further, the magnetic layer is generally formed as a single layer, but in some cases, it may be made up from a plurality of

laminated sub-layers with or without an intermediate layer interposed therebetween.

The magnetic layer is generally formed by the so-called oblique incidence evaporation process. The oblique incidence evaporation process may be any of well-known techniques preferably using an electron beam gun while the minimum incident angle with respect to the normal to the substrate is preferably 30 degrees. Evaporation conditions and post-treatments are well known in the art and any suitable ones may be selected therefrom. One effective post-treatment is a treatment for incorporating oxygen into the magnetic layer, which is also well known in the art. For further information about this evaporation process, reference should be made to D. E. Speliotis et al., "Hard magnetic films of iron, cobalt and nickel", *J. Appl. Phys.*, 36, 3, 972(1965), and Y. Maezawa et al., "Metal thin film video tape by vacuum deposition", IERE Conference Proceedings 54 (The Fourth International Conference on Video and Data Recording, The University of Southampton, Hampshire, England, 20-23 April, 1982), pp. 1-9.

On the magnetic layer is formed a topcoat consisting of an amine having the formula $RNH_2$ where R is selected from alkyl radicals having 10 to 22 carbon atoms. The alkyl radicals represented by R are preferably straight-chain, unsubstituted alkyl radicals having 10 to 22 carbon atoms, more preferably 12 to 22 carbon atoms. If the alkyl radicals of R contain less than 10 carbon atoms, the resulting topcoat and hence, magnetic recording medium exhibits reduced runnability and still life, and increased dropouts all outside the critical level. On the other hand, if the alkyl radicals of R contain more than 22 carbon atoms, dropouts increase beyond the critical level.

Examples of the alkyl radicals of R are $C_{10}H_{21}-$, $C_{12}H_{25}-$, $C_{14}H_{29}-$, $C_{16}H_{33}-$, $C_{18}H_{37}-$, $C_{20}H_{41}-$, and $C_{22}H_{45}-$.

The alkyl radicals represented by R are usually unsubstituted ones although they may be substituted with a halogen atom, hydroxyl, alkyl, aryl, alkoxy, aryloxy, alkoxycarbonyl, aryloxycarbonyl, acyl, acylamino, carbamoyl, alkylsulfonylamino, sulfamoyl, sulfonyl group or the like. These alkyl radicals are preferably of straight chain although they may be branched ones.

The alkyl amines may be synthesized by any well-known process or they may be commercially available. The use of a mixture of two or more alkyl amines is also within the scope of the present invention.

The topcoat consisting of such a monoalkyl amine or a mixture thereof has a thickness ranging from a monomolecular layer to 0.3 microns, preferably from 0.005 to 0.1 micron.

The top coat may preferably be formed by evaporation or sputtering process. Evaporation, typically by resistance heating and sputtering, typically RF or DC sputtering may be carried out under well-known conditions, for example, at a melt temperature of 80°-100° C. and an operating pressure of $1 \times 10^{-3}$ to $1 \times 10^{-1}$ Pa. Film preparation processes other than the vapor deposition and sputtering processes may also be employed, but such other processes, for example, gravure coating and calender coating are very difficult to form a uniform film as thin as defined above.

The substrate which can be used in the medium of the invention is not particularly limited although flexible substrates, particularly substrates of polyester, polyimide, polypropylene and other resins are preferred, commonly in the form of a length of tape. The thickness of the substrate varies over a wide range and is preferably in the range of 5 to 20 microns. The back surface of the substrate which is opposite to the magnetic layer bearing surface may preferably have a surface roughness or height irregularity of more than 0.05 microns (inclusive) as expressed in RMS (root mean square) value.

The magnetic recording medium of the invention is useful in video, audio and other applications.

The magnetic recording medium of the invention, which is top coated with a monoalkyl amine having an alkyl radical containing 10 to 22 carbon atoms, has a number of benefits, for example, critically reduced dynamic friction. In addition, film strength, lubricity, and head contact are greatly enhanced. As a result, the runnability and still life of the magnetic recording medium are substantially increased with minimized dropouts.

DESCRIPTION OF THE PREFERRED EMBODIMENT

Examples of the present invention are presented below by way of illustration, but not by way of limitation.

Example

Using a Co-Ni alloy having a Co/Ni weight ratio of 4/1 and a Co-Ni-Cr alloy having a Co/Ni/Cr weight ratio of 75/20/5, a magnetic layer of 0.2 μm thick was formed on a polyethylene terephthalate (PET) film of 10 μm thick by the oblique incidence evaporation process. The alloy-deposited films are designated Samples A0 and B0.

In the oblique incidence evaporation, the incident angle was 45 degrees with respect to the normal to the film or substrate, and the atmosphere contained argon and oxygen at partial pressures $P_{Ar} = 2 \times 10^{-2}$ Pa and $P_{O_2} = 1 \times 10^{-2}$ Pa.

The resulting magnetic layers had the same compositions as the corresponding alloys except that oxygen was introduced therein, and both had an atomic ratio of O/(Co+Ni) of 0.2. The layers consisted of coalesced columnar structure particles grown at an angle of about 40° with respect to the normal to the major surface of the substrate, extending throughout the layer thickness, and having a diameter of 0.01 μm.

An Auger electron-spectroscopy analysis on the layer with ion milling showed that cobalt (Co) is less in proximity to the surface and oxygen (O) is chemically shifted and has a profile rich in proximity to the surface, indicating that oxygen is present bonded with the metals on the surface of columnar structure particles.

Next, topcoats of 0.01 μm thick as shown in Table 1 were formed on the magnetic layers of Samples A0 and B0 using various organic compounds as the evaporation source in an atmosphere having a partial pressure of argon $P_{Ar} = 4 \times 10^{-3}$ Pa. The thus coated films are designated Samples A1 to A11 and B1 to B8.

The samples were tested for various properties. A commercially available VTR equipment was loaded with each sample in the form of video tape.

(1) Dynamic friction

A sample tape was driven over 50 passes in the VTR equipment. The dynamic friction coefficient μ of the sample was measured at a temperature of 40° C. and a relative humidity of 80% both at the initial and after 50 passes.

(2) Runnability

A sample tape was driven over 50 passes in the VTR equipment. The magnitute of signal output of the sample was measured at 4 MHz both at the initial and after 50 passes. The output reduction after 50 passes was expressed in dB.

(3) Still life time

The VTR equipment loaded with a sample tape was operated in the still mode, and the still life time (expressed in minute) of the tape was measured until the still picture disappeared.

(4) Dropout

A sample tape was played in the reproduction mode. Dropouts were counted as the number per minute of output reductions by 16 dB or more.

The results are shown in Table 1.

TABLE 1

| Sample | Magnetic layer | Topcoat | Dynamic friction coefficient, $\mu$ Initial | Dynamic friction coefficient, $\mu$ After 50 passes | Output reduction (dB) | Still life time (min) | Dropout (/min) | Remarks |
|---|---|---|---|---|---|---|---|---|
| A0 | Co—Ni—O | — | 0.45 | 0.60 | −10 | <1 | 1000 | Comparison |
| A1 | " | $C_6H_{13}NH_2$ | 0.30 | >1.0 | −8 | 10 | 600 | Comparison |
| A2 | " | $C_8H_{17}NH_2$ | 0.25 | 0.60 | −5 | 20 | 400 | Comparison |
| A3 | " | $C_{10}H_{21}NH_2$ | 0.20 | 0.23 | −2.0 | >60 | 150 | |
| A4 | " | $C_{14}H_{29}NH_2$ | 0.18 | 0.20 | −2.1 | >60 | 140 | |
| A5 | " | $C_{16}H_{33}NH_2$ | 0.17 | 0.21 | −2.0 | >60 | 120 | |
| A6 | " | $C_{18}H_{37}NH_2$ | 0.16 | 0.16 | −2.0 | >60 | 110 | |
| A7 | " | $C_{20}H_{41}NH_2$ | 0.14 | 0.14 | −1.4 | >60 | 120 | |
| A8 | " | $C_{22}H_{45}NH_2$ | 0.13 | 0.13 | −1.2 | >60 | 100 | |
| A9 | " | $C_{24}H_{49}NH_2$ | 0.15 | 0.16 | −1.2 | >60 | 350 | Comparison |
| A10 | " | $C_{16}H_{33}COOH$ | 0.22 | 0.40 | −8 | 15 | 500 | Comparison |
| A11 | " | $C_{16}H_{33}COOC_{10}H_{21}$ | 0.25 | 0.55 | −8 | 10 | 700 | Comparison |
| B0 | Co—Ni—Cr—O | — | 0.45 | 0.60 | −10 | <1 | 1000 | Comparison |
| B1 | " | $C_8H_{17}NH_2$ | 0.25 | 0.60 | −8 | 20 | 400 | Comparison |
| B2 | " | $C_{10}H_{21}NH_2$ | 0.20 | 0.21 | −2.0 | >60 | 150 | |
| B3 | " | $C_{14}H_{29}NH_2$ | 0.17 | 0.21 | −2.1 | >60 | 140 | |
| B4 | " | $C_{16}H_{33}NH_2$ | 0.16 | 0.16 | −2.1 | >60 | 120 | |
| B5 | " | $C_{18}H_{37}NH_2$ | 0.15 | 0.15 | −2.2 | >60 | 120 | |
| B6 | " | $C_{22}H_{45}NH_2$ | 0.13 | 0.13 | −2.1 | >60 | 140 | |
| B7 | " | $C_{24}H_{49}NH_2$ | 0.15 | 0.16 | −2.0 | >60 | 360 | Comparison |
| B8 | " | $C_{16}H_{33}COOH$ | 0.25 | 0.55 | −8 | 15 | 700 | Comparison |

The data in Table 1 reveal that the alkyl amine topcoat of the present invention exhibits improved performance over the prior art topcoats and that the number of carbon atoms in the alkyl is critical.

What we claim is:

1. A magnetic recording medium comprising a substrate, a continuous thin magnetic layer on the substrate, and a topcoat formed over the magnetic layer, characterized in that the topcoat consists of a compound having the formula:

$$RNH_2$$

where R is an alkyl radical having 10 to 22 carbon atoms deposited by evaporation or sputtering.

2. The magnetic recording medium according to claim 1 wherein the alkyl radical represented by R is of straight chain.

3. The magnetic recording medium according to claim 2 wherein the alkyl radical is unsubstituted.

4. The magnetic recording medium according to claim 1 wherein R is selected from straight chain, unsubstituted alkyl radicals having 12 to 22 carbon atoms.

5. The magnetic recording medium according to claim 1 wherein the topcoat has a thickness of not more than 0.3 microns.

6. The magnetic recording medium according to claim 1 wherein the magnetic layer consists essentially of cobalt.

7. The magnetic recording medium according to claim 6 wherein the magnetic layer contains nickel and the weight ratio of cobalt to nickel is at least 1.5.

8. The magnetic recording medium according to claim 6 wherein the magnetic layer contains chromium and the weight ratio of chromium to cobalt ranges from 0.001 to 0.1.

9. The magnetic recording medium according to claim 7 wherein magnetic layer further contains chromium and the weight ratio of chromium to the sum of cobalt and nickel ranges from 0.001 to 0.1.

10. The magnetic recording medium according to claim 6 wherein the magnetic layer contains oxygen and the atomic ratio of oxygen to cobalt is not more than 0.45.

11. The magnetic recording medium according to claim 7 wherein the magnetic layer further contains oxygen and the atomic ratio of oxygen to the sum of cobalt and nickel is not more than 0.45.

12. The magnetic recording medium according to claim 1 or 6 wherein the magnetic layer consists of a coalescence of particles of columnar structure oriented oblique to the normal to the substrate.

13. The magnetic recording medium according to claim 12 wherein the magnetic layer has a thickness of 0.05 to 0.5 microns.

14. The magnetic recording medium according to claim 6, wherein said magnetic layer further includes at least one member selected from the group consisting of nickel, chromium and oxygen.

* * * * *